United States Patent
Ollila

(10) Patent No.: US 7,352,172 B2
(45) Date of Patent: Apr. 1, 2008

(54) RELATIVE POSITION DETECTING APPARATUS USING MAGNETO-RESISTORS

(75) Inventor: Mikko Ollila, Tampere (FI)

(73) Assignee: Nokia Corporation, Espoo (FI)

( * ) Notice: Subject to any disclaimer, the term of this patent is extended or adjusted under 35 U.S.C. 154(b) by 385 days.

(21) Appl. No.: 11/091,363

(22) Filed: Mar. 16, 2005

(65) Prior Publication Data

US 2005/0219962 A1    Oct. 6, 2005

(30) Foreign Application Priority Data

Mar. 16, 2004   (FI)   ................................. 20045079

(51) Int. Cl.
*G01R 33/09* (2006.01)
*G01B 7/14* (2006.01)
(52) U.S. Cl. ................. 324/207.21; 324/251; 324/244; 324/244.1
(58) Field of Classification Search .......... 324/207.21, 324/252, 244, 244.1, 260, 249; 369/13.14, 369/13.17
See application file for complete search history.

(56) References Cited

U.S. PATENT DOCUMENTS 5,430,375 A   7/1995   Inoue et al.
5,587,846 A   12/1996  Miyano et al.
2005/0073777 A1 *  4/2005  Hasegawa et al. .......... 360/321

OTHER PUBLICATIONS

JP Abstract 2000356733 (Sony Corp., Dec. 26, 2000).
JP Abstract 2000356504 (Sony Corp., Dec. 26, 2000).

* cited by examiner

*Primary Examiner*—Bot LeDynh

(57) ABSTRACT

The device according to the present invention comprises at least one magnetic field generating element, at least one magneto-resistor and at least one resistance-to-current converter generating a current signal dependent on the resistance value of said at least one magneto-resistor. According to the preferred embodiment of the invention four magneto-resistors are used. A plurality of signals dependent on the ratios of the resistance values of said magneto-resistors are generated, the signals being in different phases. The mutual equality of a predetermined pair of the signals and/or the linear combinations thereof is realized only at predetermined relative positions. The relative position of the movable object is determined by counting the number of such predetermined relative positions passed during the movement of the movable object.

20 Claims, 11 Drawing Sheets

RELATIVE POSITION DETECTING APPARATUS USING MAGNETO-RESISTORS

FIELD OF THE INVENTION

The present invention relates to the detection of the relative positions of movable objects in optical imaging systems.

BACKGROUND OF THE INVENTION

There is a need to determine the relative positions of certain objects in optical imaging systems. For example, the positions of focusing and zoom lenses or lens systems have to be accurately adjusted.

U.S. Pat. Nos. 5,587,846 and 5,430,375 disclose position-detecting systems using magneto-resistors and magnetic field generating elements.

The resistance value of a magneto-resistor depends on the magnetic field. Thus the movement of the magnetic field generating elements with respect to the magneto-resistors cause variations of the resistance values of the magneto-resistors. According to the patents U.S. Pat. Nos. 5,587,846 and 5,430,375, the magneto-resistors are arranged in pairs, each pair being connected in series thus that a predetermined voltage difference is applied over each pair. The common connection point of the two resistors of each pair generates a voltage signal, which depends on the resistance values of the resistors. Consequently, the generated voltage depends on the relative position of the magnetic field generating elements. The generated voltage signals are subsequently processed and analyzed to obtain the information regarding the relative position of said movable object.

SUMMARY OF THE INVENTION

It is an object of the present invention to improve the tolerance of radio-frequency interference of relative position detecting apparatus attached to optical imaging systems. A further object of the present invention is to allow fast and reliable processing of signals related to the relative position detecting apparatus.

According to a first aspect of the present invention, a position detecting apparatus is provided in connection with an optical imaging system comprising at least one magneto-resistor and at least one magnetic field generating element, the respective resistance value of said at least one magneto-resistor being dependent on the magnetic field generated by the at least one magnetic field generating element, wherein said position detecting apparatus further comprises at least one resistance-to-current converting means to generate a current signal dependent on the resistance value of said at least one magneto-resistor.

According to a second aspect of the present invention, a mobile device is provided comprising an optical imaging system and in connection with said optical imaging system a position detecting apparatus arranged to detect the position of a least one optical component of said imaging system, said position detecting apparatus comprising at least one magneto-resistor and at least one magnetic field generating element, the respective resistance value of said at least one magneto-resistor being dependent on the magnetic field generated by the at least one magnetic field generating element, wherein said position detecting apparatus further comprises at least one resistance-to-current converting means to generate a current signal dependent on the resistance value of said at least one magneto-resistor.

According to a third aspect of the present invention, a mobile communication device is provided comprising an optical imaging system and in connection with said optical imaging system a position detecting apparatus arranged to detect the position of a least one optical component of said imaging system, said position detecting apparatus comprising at least one magneto-resistor and at least one magnetic field generating element, the respective resistance value of said at least one magneto-resistor being dependent on the magnetic field generated by the at least one magnetic field generating element, wherein said position detecting apparatus further comprises at least one resistance-to-current converting means to generate a current signal dependent on the resistance value of said at least one magneto-resistor.

The relative position detecting apparatus according to the present invention is mainly characterized in that said apparatus comprises at least one magnetic field generating element, at least one magneto-resistor and at least one resistance-to-current converter generating a current signal dependent on the resistance value of said at least one magneto-resistor.

A current signal is herein defined as a signal in which the transferred information content is primarily associated with the magnitude of the electric current of said signal.

Oscillators, digital signal processing circuits, transformer coils and motors contained within optical imaging systems may generate electro-magnetic interference. Especially, radio transmitters, receivers and digital signal processing means contained in mobile communication devices equipped with optical imaging systems act as sources of electromagnetic interference. In digital cameras, in general, the amount of digital signal processing is high making them noisy environments in this sense. Such interference is typically coupled to a signal transferring or processing circuit loop as an undesirable noise voltage, superposed over the actual signal. The presence of noise voltage can lead to erroneous processing and interpretation of the signals if the information is primarily associated with the voltage of the signals. Therefore, the use of the relative position detecting apparatus according to the present invention improves the tolerance of the system to electromagnetic interference.

According to the invention, either the at least one magnetic field generating element or the at least one magneto-resistor is attached to a movable object, the relative position of said movable object being the object of interest. The relative movement of the at least one magnetic field generating element with respect to the at least one magneto-resistor is arranged to take place in such a way, that the relative movement causes variations of the resistance value of said at least one magneto-resistor, a current signal dependent on said the resistance value of said at least one magneto-resistor being generated.

According to an embodiment of the invention, the relative position detecting apparatus comprises four magneto-resistors, comparators, a pulse generator, a direction detector and a counter. The resistance value of each magneto-resistor is converted to a current signal. A plurality of signals being linear combinations of the ratios of the resistance values of said magneto-resistors are generated, the signals being in different phases with respect to the relative position. The mutual equality of a predetermined pair of the signals and/or the linear combinations thereof is realized only at certain predetermined relative positions. The relative magnitudes of the signals are compared by the comparators in order to identify said predetermined relative positions. During the movement of the magnetic field generating elements, the pulse generator coupled to the signal comparators generates a pulse each time the magnitude of one signal of a signal pair of the plurality of the signal pairs exceeds the magnitude of the other signal of said signal pair. The relative position of the movable object is determined by counting the number of such predetermined relative positions passed during the movement of the movable object. Each generated pulse either increases or decreases a number stored in the counter memory, depending on the state of the direction detector. The value of said number indicates the relative position of the object.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION OF THE INVENTION

First Embodiment

The invention is now explained in more detail referring to an embodiment of the relative position detecting apparatus comprising four magneto-resistors.

Figure 1:
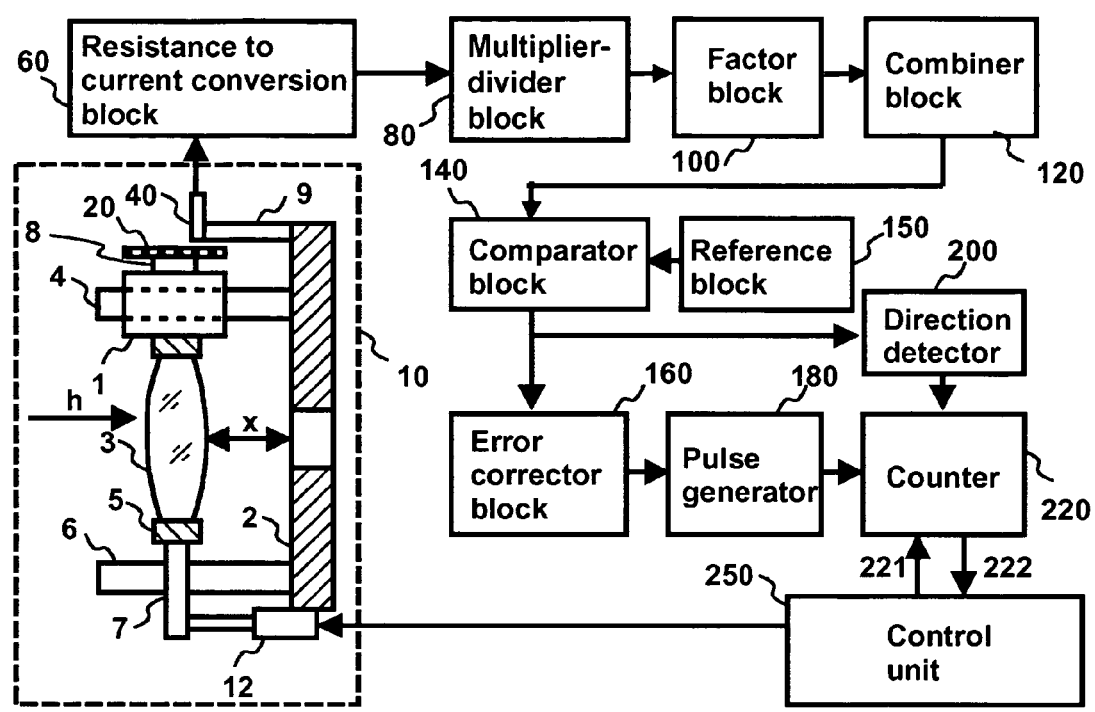
FIG. 1 shows a block diagram of a device according to the present invention.

Referring to FIG. 1, the optical imaging system 10 comprises a lens 3, a lens frame 5, a bushing 1, a guide pin 7. A magnetic rod 20 is attached to the bushing 1 by a magnetic rod support 8. The parts 3, 5, 7, 10, 20 form together an assembly that is moved along the guide-ways 4, 6 with respect to the system body 2. The movement takes place either in the direction indicated by the arrow h or to the opposite direction in order to adjust the relative position x of the lens 3 with respect to the body 2.

The movement of the lens can take place by an actuator 12, the actuator 12 being controlled by a control unit 250. The actuator may be a piezo-electric actuator. The actuator may also be based on a motor and gear mechanism.

A magneto-resistor block 40, comprising four magneto-resistors 42 is positioned near the magnetic rod 20. The magneto-resistor block 40 is supported by a magneto-resistor block holder 9. The magneto-resistor block 40 is stationary with regard to the body 2. The resistance values of the four magneto-resistors 42 are converted to four current signals in a current transmitter block 60. The generated current signals are subsequently processed in a multiplier-divider block 80, factor block 100, combiner block 120, comparator block 140, error corrector block 160, pulse generator 180, direction detector 200 and counter 220. The counter communicates with the control unit 250 by signals 221, 222.

Figure 2:
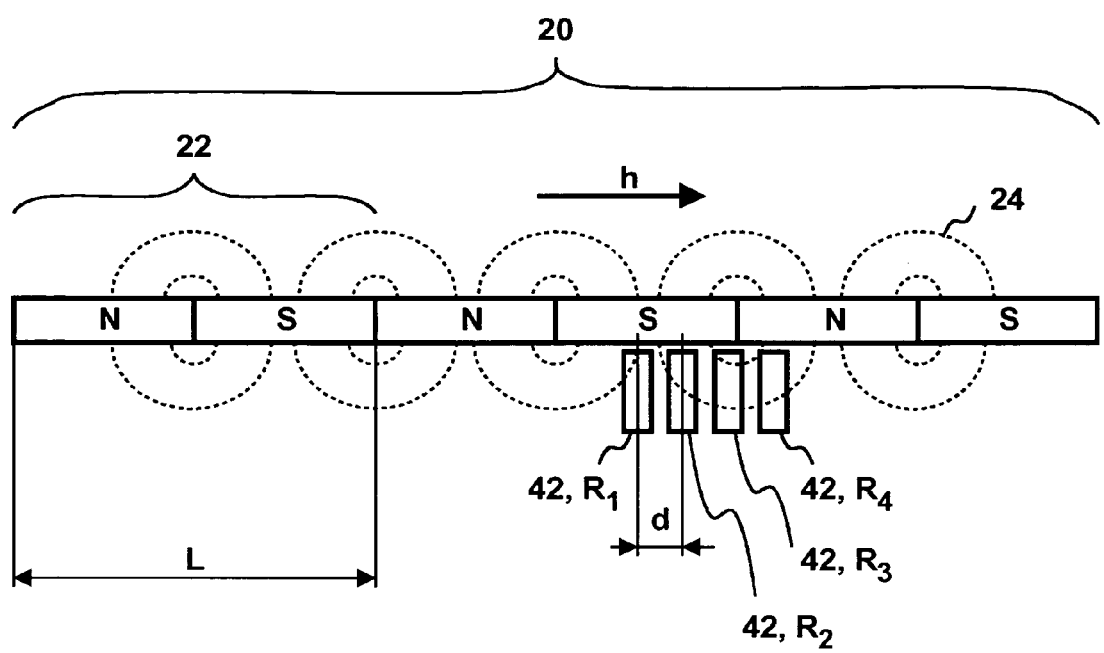
FIG. 2 shows the arrangement of the magnetic field generating elements and the magneto-resistors in the first embodiment.

Referring to FIG. 2, The magnetic rod 20 comprises a plurality of magnetic field generating elements 22 arranged adjacent to each other to generate an alternating magnetic field 24 with respect to the relative position of the magnetic rod. Each magnetic field generating element 22 has a magnetic north pole N and a south pole S. The magnetic field 24 generated by the plurality of the elements 22 varies periodically with regard to the position, the field having a characteristic period of length L. The four magneto-resistors 42, individually marked as $R_1$, $R_2$, $R_3$, $R_4$, are positioned such that the distance d between the centerlines of two adjacent magneto-resistors is equal to L/8. In the embodiment, the length L of the period is selected to 168 μm, and the preferred distance d between two adjacent magneto-resistors is thus 21 μm. The movement of the magnetic rod 20, associated with the movement of the lens 3, causes periodic variations of the four resistor values $r_1$, $r_2$, $r_3$, $r_4$ of the magneto-resistors $R_1$, $R_2$, $R_3$, $R_4$. Consequently, the resistance values $r_1$, $r_2$, $r_3$, $r_4$ alternate in different phases with regard to each other.

It is clear for the person skilled in the art that the dimensions may substantially deviate from the specific values indicated above.

The magnetic field is a vector quantity. A magneto-resistor is typically direction sensitive. The term "magnetic field" is herein used to refer to the magnitude B of the component of the magnetic field vector in one of the two most sensitive directions of the magneto-resistor. These two directions are opposite to each other. Said two directions are marked with a plus sign and a minus sign, which are used to identify the direction of said component of the magnetic field vector.

Figure 3:
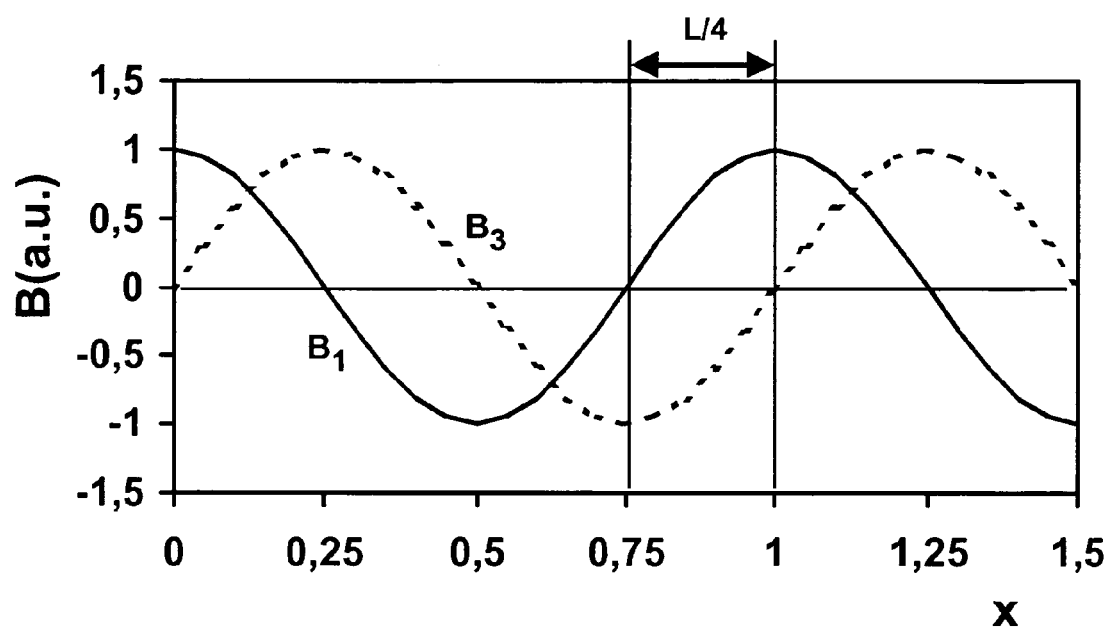
FIG. 3 shows the evolution of the magnetic fields affecting the first magneto-resistor and the third magneto-resistor in the first embodiment.

FIG. 3, illustrates the magnetic fields $B_1$ and $B_3$ affecting the magneto-resistors $R_1$ and $R_3$ versus the relative position x of the lens 3. The physical distance between the centerlines of the magneto-resistors $R_1$ and $R_3$ is L/4. The phase difference between the magnetic fields $B_1$ and $B_3$ experienced by the magneto-resistors $R_1$ and $R_3$ is also equal to L/4. The magnetic fields affecting the magneto-resistors $R_2$ and $R_4$ exhibit similar periodic variation (not shown in FIG. 3). The phase difference between the magnetic fields affecting two adjacent magneto-resistors is L/8.

Figure 4:
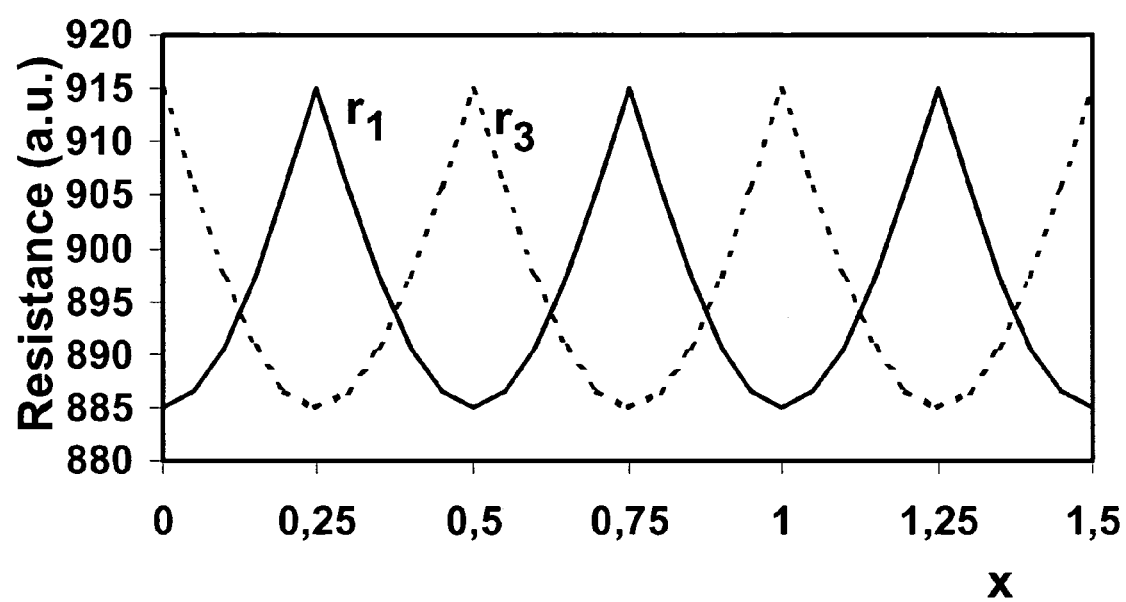
FIG. 4 shows the evolution of the resistance values of the first magneto-resistor and the third magneto-resistor in the first embodiment.

FIG. 4 illustrates the resistance values $r_1$, $r_3$ of the magneto-resistors $R_1$, $R_3$ versus the relative position x. The maximum value of the resistance is typically associated with zero magnetic field. The resistance values $r_2$ and $r_4$ of the magneto-resistors $R_2$ and $R_4$ exhibit similar periodic variation (not shown in FIG. 4).

Figure 5:
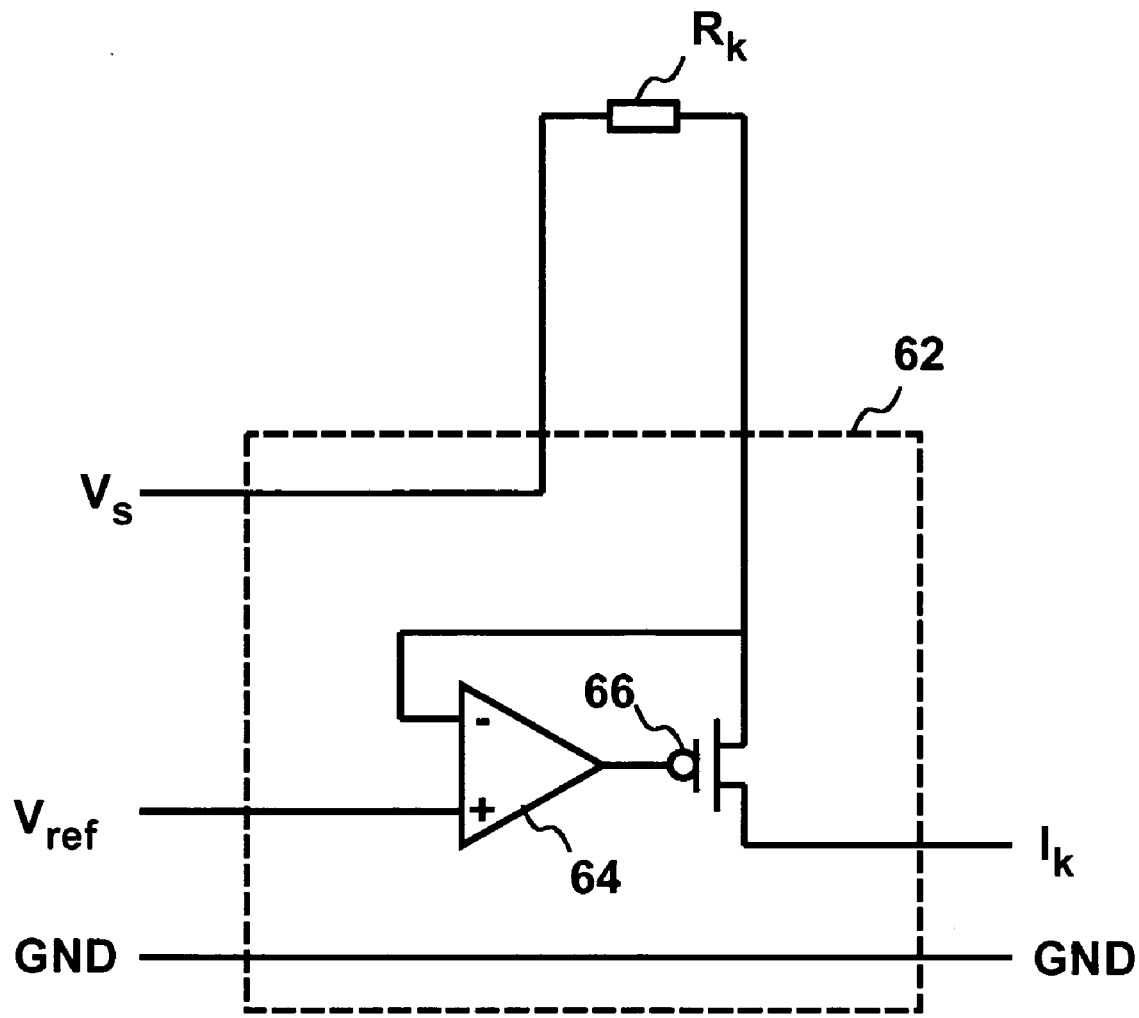
FIG. 5 shows the circuit diagram of a single resistance-to-current converter in the first embodiment.

The current transmitter block 60 comprises four resistance-to-current converters. FIG. 5 depicts an example of one possible embodiment of a single resistance-to-current converter 62. In operation, the current output of the converter 62 is coupled to a current drain capable of absorbing the generated current $I_k$ generated by the resistance-to-current converter 62 (k=1, 2, 3, 4). The idea of the converter 62 is that a substantially constant voltage difference is applied over a single magneto-resistor $R_k$ in order to generate a current signal inversely proportional to the resistance value $r_k$ of the magneto-resistor $R_k$. The combination of an operational amplifier 64 and an isolated gate field effect transistor 66 keeps the voltage difference over the magneto-resistor $R_k$ equal to a predetermined substantially constant voltage difference $V_S-V_{ref}$, in which $V_S$ and $V_{ref}$ are different reference voltages. The magneto-resistor $R_k$ can be coupled over to any substantially constant voltage difference. $V_s$ may be coupled to the power supply voltage or alternatively, to the ground voltage GND, for example. Typically, the ground voltage GND is less susceptible to interference than the power supply voltage, and therefore the coupling to GND may be advantageous instead of coupling to the power supply voltage.

The current signal $I_k$ is generated according to the equation $$I_k = \frac{V_s - V_{ref}}{R_k}, \quad (1)$$

i.e. each current signal $I_k$ is inversely proportional to the resistance value $r_k$ of the respective magneto-resistor $R_k$.

The input impedance of the circuit depicted in FIG. 5 regarding the magneto-resistor and the output current, respectively, is very low. Consequently the noise and electromagnetic interference are effectively suppressed.

Figure 6:
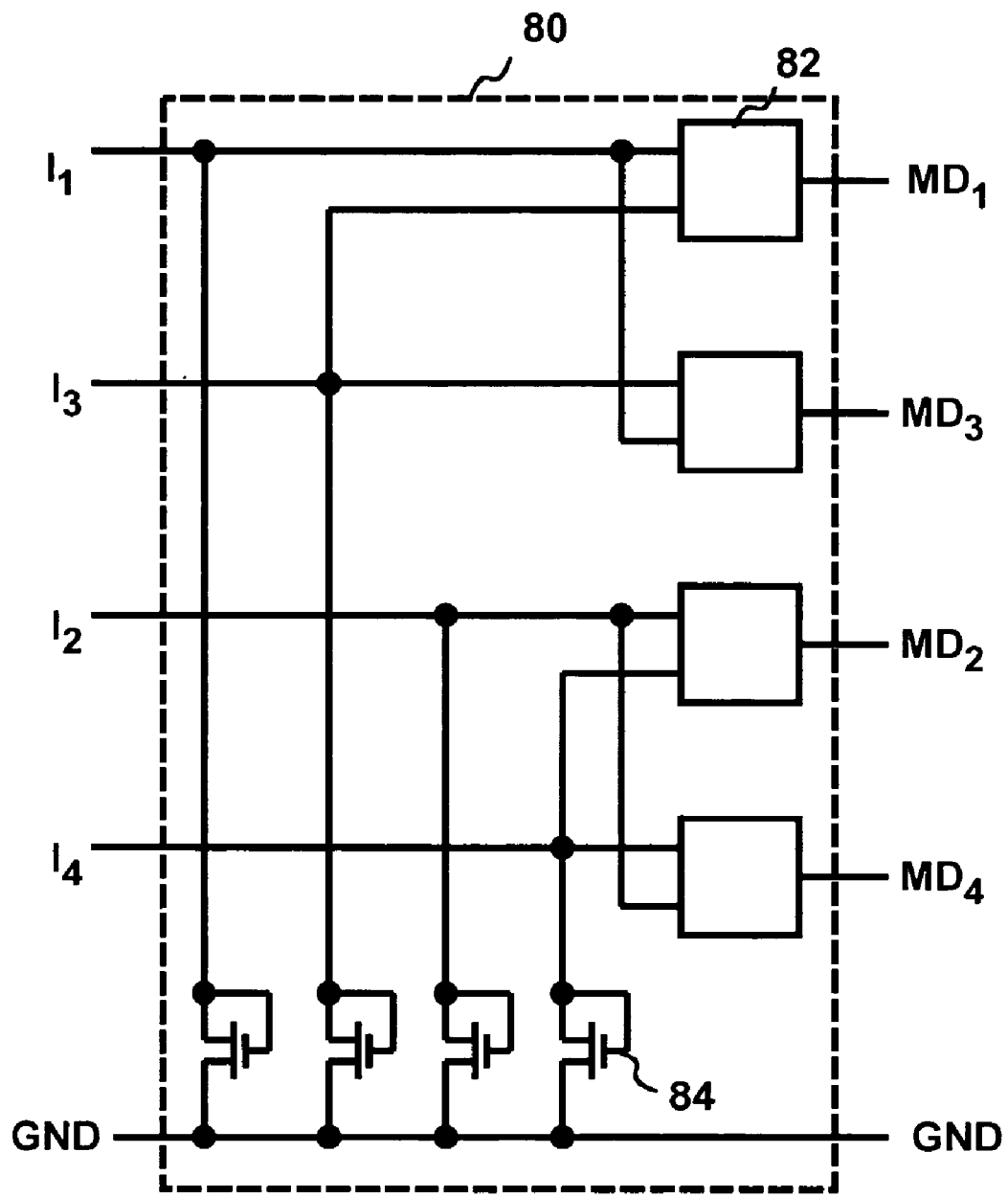
FIG. 6 shows the diagram of the multiplier-divider block in the first embodiment.

The current signals $I_1$, $I_2$, $I_3$, $I_4$ (see FIG. 6) are coupled to a multiplier-divider block 80. The multiplier-divider block 80 generates four current signals $MD_1$, $MD_2$, $MD_3$, $MD_4$ proportional to the current ratios $I_3/I_1/I_2$, $I_1/I_3$ and $I_2/I_4$, respectively. As the current signals generated by the resistance-to-current converters 62 are essentially proportional to the respective resistance values, the four signals $MD_1$, $MD_2$, $MD_3$, $MD_4$ exhibit a proportional relationship also with the resistance ratios $r_1/r_3$, $r_2/r_4$, $r_3/r_1$ and $r_4/r_2$, respectively. The generated signals $MD_1$, $MD_2$, $MD_3$, $MD_4$ are summarized in Table 1 (appearing near the end of this specification).

The generation of the signals $MD_1$, $MD_2$, $MD_3$, $MD_4$ is realized using electrical circuits known as translinear multipliers by anyone of skill in the art. The translinear multiplier generates a current signal proportional to the ratio of two input currents. The signal generated by the translinear multiplier is also proportional to a third input current, which is supplied by a current generator (not shown) and which is substantially constant. The magnitude of the third current can be selected to adjust the average level of the generated signals $MD_1$, $MD_2$, $MD_3$, $MD_4$. The adjustment is made in order to obtain optimum coupling of the signals to the following signal processing stages, e.g. as shown in FIG. 1, to the factor block 100, combiner block 120 and comparator block 140.

Referring back to FIG. 6, the multiplier-divider block 80 comprises four multiplier-dividers 82 and four diode-connected transistors 84. Each multiplier-divider 82 together with the diode-connected transistors 84 is equivalent to a translinear multiplier. The diode-connected transistors 84 distribute the information carried by the current signals $I_k$ to the multiplier-dividers 82. Furthermore, the diode-connected transistors 84 act as parts of the so-called current mirror circuits in the translinear multipliers.

The output signal level of the translinear multipliers is preferably adjusted according to the requirements of the following signal processing circuits. The output signal level can be adjusted, for example, by setting the current of certain constant current generators (not shown) coupled to the translinear multipliers. Furthermore, the output signal level can be adjusted to compensate effects caused by temperature variations.

A magneto-resistor is sensitive to environmental conditions, e.g. to the temperature. It is likely that all magneto-resistors 42 within the same magneto-resistor block 40 exhibit substantially similar dependence on the environmental effect. Therefore, the division of a resistance value by another resistance value, said resistance values being related magneto-resistors in the same block 60 substantially reduces the effect of common mode disturbances. These disturbances can be caused by temperature variations, magnetic interference, electromagnetic interference or mechanical vibration, for example. The effect of the disturbances is effectively cancelled out thanks to the determination of the resistance ratios.

Figure 8:
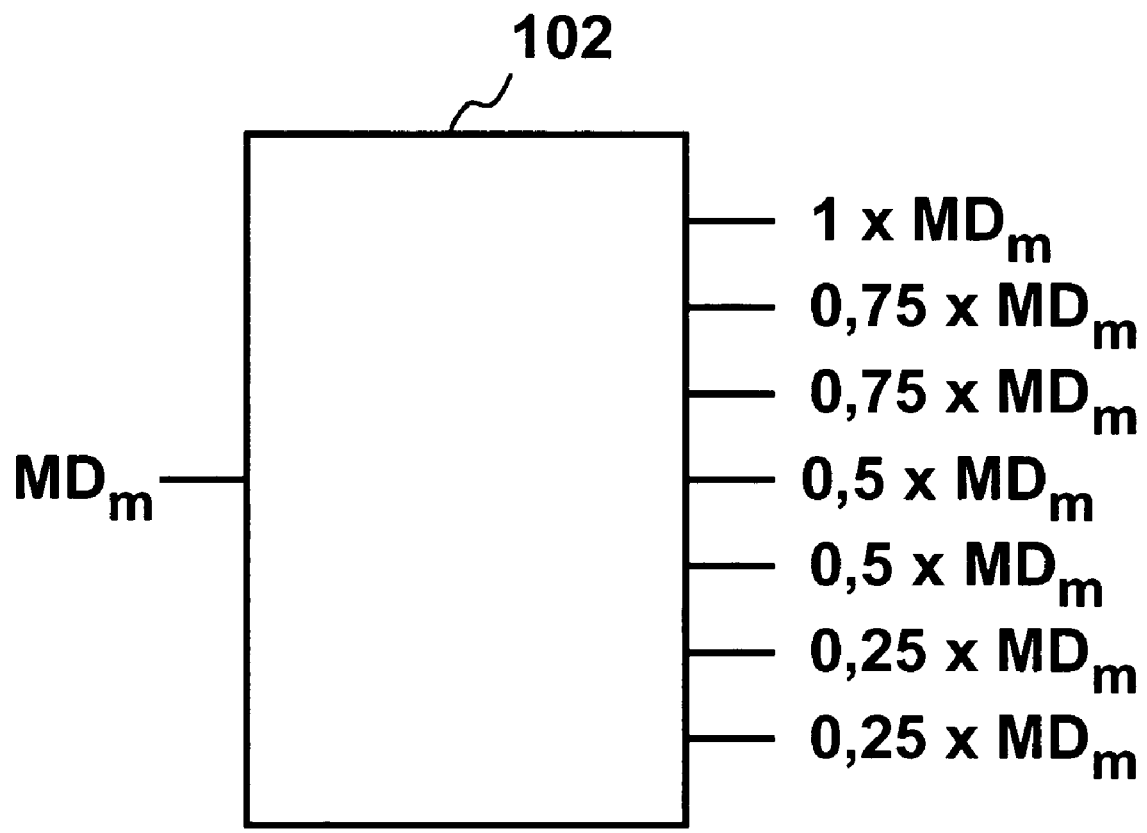
FIG. 8 shows the input and output connections of a single factor unit in the first embodiment.

Referring to FIGS. 1 and 8, the factor block 100 comprises four factor units 102. Each factor unit 102 generates a plurality of current signals proportional to the input signal $MD_m$, (m=1, 2, 3, 4). Each of the signals $MD_1$ to $MD_4$ is coupled to a respective factor unit input. The factor units 102 can be realized using known electrical circuits based on transistors and resistors.

The signals obtained from the factor units 102 are coupled to the combiner block 120. The signals are added together in the combiner block 120 to form output signals $LC_1$ to $LC_{16}$ according to Table 2 below. The output signals of the factor units 102 are current signals, and the addition is easily realized by coupling the associated signal conductors together.

The comparator block comprises a plurality of comparator units to discriminate which signal of a predetermined input signal pair is greater (or equal). The states of the comparator outputs $C_{out,1}$ to $C_{out,16}$ are determined according to Table 3 below. The comparator outputs are digital in this embodiment. Each of the signals $LC_1$ to $LC_{16}$ is coupled to the respective input $C_{in,1}$ to $C_{in,16}$ of the comparator block 140, i.e. $LC_1$ is coupled to $C_{in,1}$, $LC_2$ is coupled to $C_{in,2}$ etc.

Figure 7:
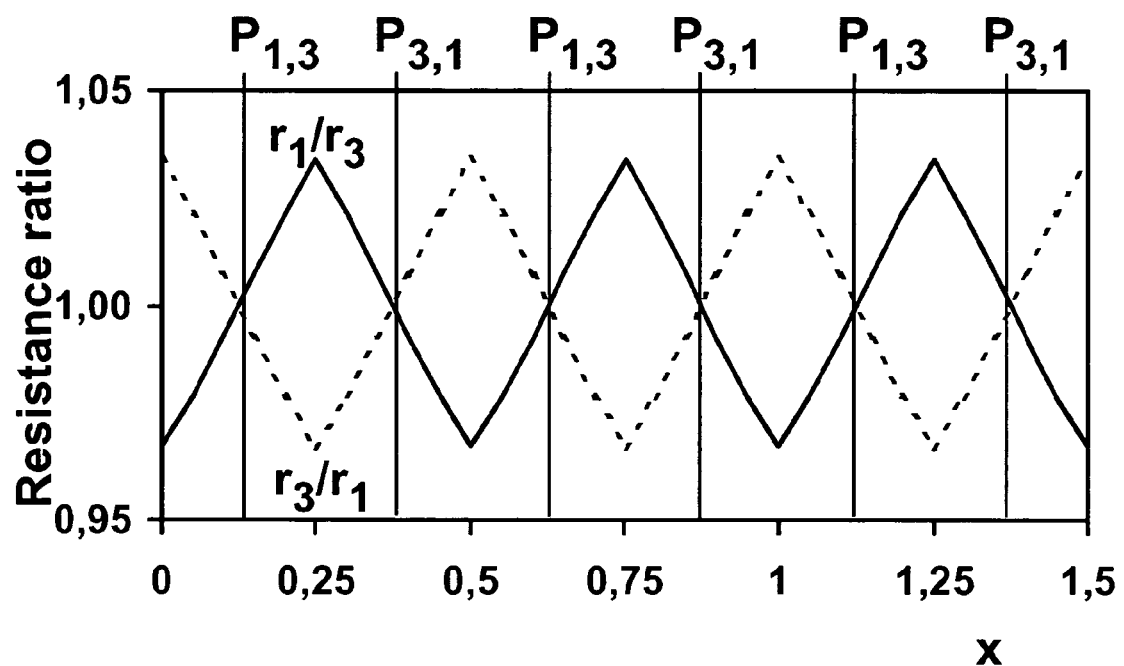
FIG. 7 shows the evolution of the resistance ratios of the first magneto-resistor and the third magneto-resistor in the first embodiment.

FIG. 7 shows the evolution of the resistance ratios $r_1/r_3$ and $r_3/r_1$ versus the relative position x. Said two resistance ratios are equal only at certain predetermined positions $P_{1,3}$ or $P_{3,1}$, in which the solid and dashed curves in FIG. 7 exhibit equal values. According to Tables 1 and 2, the two comparator output signals $C_{in,1}$ and $C_{in,9}$, generated on the basis of the resistance ratios $r_1/r_3$ and $r_3/r_1$, are also equal at said positions. Thus, according to Table 3, the comparator two outputs $C_{out,1}$ and $C_{out,9}$ change values at said positions $P_{1,3}$ or $P_{3,1}$. During the movement of the magnetic rod 3, each change of each of the comparator outputs $C_{out,1}$ to $C_{out,16}$ takes place at different positions, the difference between the adjacent positions being substantially equal to L/16.

However, it is still possible that some comparator outputs $C_{out,1}$ to $C_{out,16}$ exhibit a wrong value, for example due to interference or metastability of the comparators. Therefore the validity of the comparator output signals is verified in the error corrector block 160. Each comparator output $C_{out,1}$ to $C_{out,16}$ is coupled to a respective error corrector block input $E_{in,1}$ to $E_{in,16}$. The error correction block 160 has sixteen error corrector units. Each error corrector unit has three inputs $E_{in,q-1}$, $E_{in,q}$, $E_{in,q+1}$ (q=integer 1 to 16), said three inputs being coupled to three adjacent comparator outputs $C_{out,q-1}$, $C_{out,q}$, $C_{out,q+1}$, respectively (when q =1 then $E_{in,q-1}=E_{in,16}$, when q=16 then $E_{in,q+1}=E_{in,1}$). The state of each error corrector output $E_{out,q}$ is determined according to Table 4. The state of each output $E_{out,q}$ is equal to the state of the respective input $E_{in,q}$, providing that at least one of the inputs $E_{in,q-1}$, and $E_{in,q+1}$ is in the same state as the input $E_{in,q}$.

In general, the idea of the verification by the error corrector block 160 is that the comparator outputs (i.e. also the respective inputs of the error corrector block) are arranged such that when the magnetic rod 20 is moved to one direction, the comparator output states should change consecutively. In other words, when the state of an output $C_{out,q-1}$ changes, the next output to change its state can be $C_{out,q-2}$ or $C_{out,q}$, but not $C_{out,q+1}$. $C_{out,q+1}$ is not adjacent to $C_{out,q-1}$ in the sense meant by the expression consecutive. Vice versa, when the state of an output $C_{out,q+1}$ changes, the next output to change its state can be $C_{out,q}$, or $C_{out,q+2}$, but not $C_{out,q-1}$ (when q=1 then $C_{in,q-2}=C_{in,15}$, when q=16 then $C_{in,q+2}=C_{in,2}$). If the comparator output states do not change consecutively, some output states are not associated with the movement of the magnetic rod, but originate due to some other reason, e.g. interference. Such a case is defined to be physically impossible.

The above-mentioned idea is implemented in the error corrector block according to Table 4 below. When the state of the error corrector inputs is, for example, $E_{in,q-1}=1$, $E_{in,q}=0$ and $E_{in,q+1}=0$, the next physically possible state can be, for example, $E_{in,q-1}=1$, $E_{in,q}=1$ and $E_{in,q+1}=0$, but not $E_{in,q-1}=1$, $E_{in,q}=0$ and $E_{in,q+1}=1$. The error corrector inputs are arranged to change state consecutively, and thus the next input to change state directly after $E_{in,q-1}$ can be $E_{in,q}$, but it should not be $E_{in,q+1}$.

The additional outputs denoted by $ErrCode_q$ in Table 4 are interfaced to the control unit 250. If erroneous operation is detected, the movement of the positioning system can be interrupted or initialized. $ErrCode_q=1$ indicates erroneous operation and a physically impossible state of the comparator outputs.

The pulse generator 180 generates a short pulse of short duration corresponding to each change of the error correction block 160 outputs $E_{out,q}$, i.e. corresponding to each acceptable change of the comparator outputs. When the comparator outputs correspond to a physically impossible state, the error corrector block prevents the generation of a pulse by the pulse generator 180.

The inputs and outputs of the error corrector block 160 are digital in this embodiment. On the basis of Table 4, the person experienced in the art is capable of designing the error corrector block 160 using known electrical circuits.

The direction detector 200 determines on the basis of the comparator outputs the direction of the movement. Any person skilled in the art is capable of designing the direction detector using known electrical circuits. The inputs and outputs of the direction detector 200 are digital in this embodiment.

The counter 220 has a number stored in its memory. The number comprises the information regarding the relative position. Each pulse generated by the pulse generator 180 either increases or decreases the number depending on the output value of the direction detector 200. The number is communicated to the control unit 250 as the signal 222. The counter is initialized by moving the bushing 1 as close to the body 2 as physically possible and subsequently initializing the counter by sending an initializing signal 221 to the counter. The inputs and outputs of the counter 220 are digital in this embodiment.

Theoretically, a spatial resolution of of L/32, i.e. 5.25 µm, is achieved in the embodiment. It should be realized that the European usage of "5.25" is used throughout herein where the comma signifies the same thing as a decimal in American usage (see particularly the Figures). In other words, the relative position is determined essentially by interpolation. The resolution L/32 is substantially better than the distance d between the centerlines of two adjacent magneto-resistors (d=L/8).

Further Embodiments

The relative position detecting apparatus according to the present invention can be realized using one, two, three, four, five or any greater number of magneto-resistors.

Either the magneto-resistors or the magnetic field generating elements or both can be attached to a movable object/objects. However, if current carrying wires are used for communicating the position information, it is advantageous to avoid flexing of the wires by attaching the magneto-resistors to the non-movable object.

Figure 9:
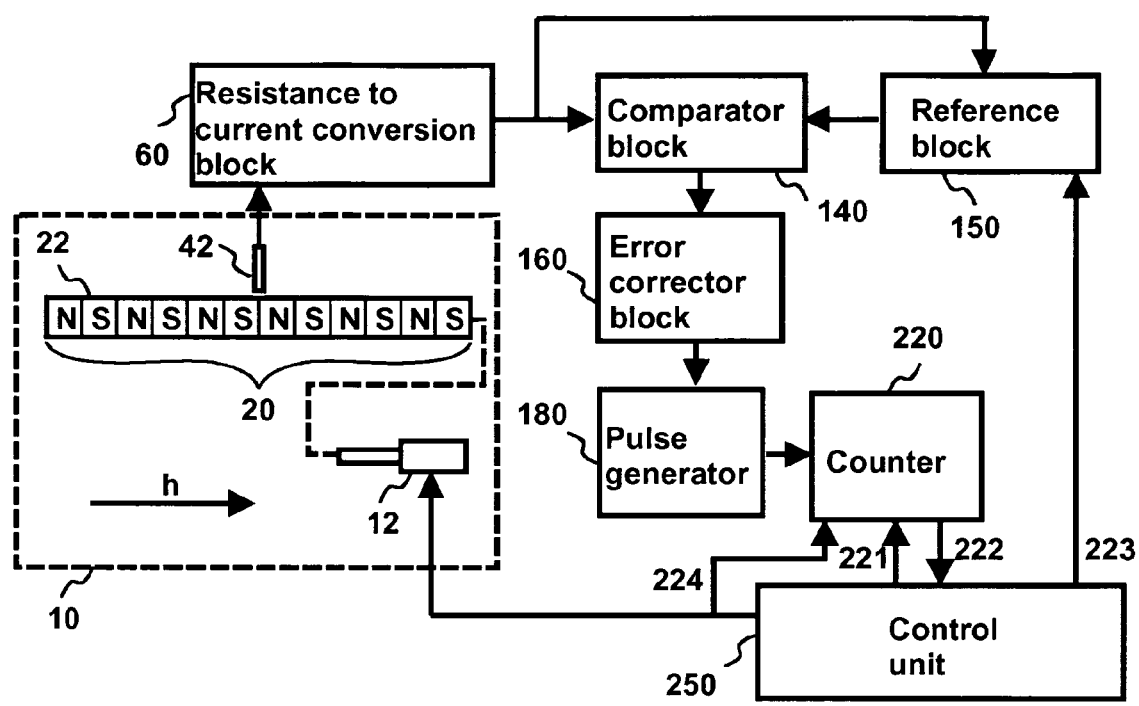
FIG. 9 shows a block diagram related to a further embodiment, in which a single magneto-resistor is used.

Referring to FIG. 9, the relative position detecting apparatus according to the present invention can be realized by one magneto resistor 42.

The resistance value of the magneto-resistor is converted to a current signal in a resistance-to-current converter, respectively. The generated current signal is compared in a comparator with at least one reference signal, said reference signal being generated by a reference signal generating means 150. The values of the comparator outputs change when the at least one magnetic field generating element is moved with respect to the magneto resistor 42. The changes of the comparator outputs are used to generate pulses by the pulse generator. The pulses increase or decrease the number stored in the counter memory, depending on the direction of the movement. Said number is related to the relative position.

The reference values generated by the reference value generating means 150 can be substantially constant. However, the reference values may also be generated on the basis of the current signals $I_k$ generated by the resistance-to-current converters 62. For example, the average value of the signal $I_k$ detected during the movement of the magnetic rod 20 can also be used as a reference value. The average value can be determined, for example, by low pass filtering during the movement of the magnetic rod 20. The control unit 250 communicates with the reference value generating means 150 by the signal 223 in order to indicate the movement of the magnetic rod 20.

A plurality of independent comparator output values can be generated by providing several reference signals having different magnitude.

When the movable object is moved by an actuator, also the actuator controlling signal 224 can be used to generate the direction information, instead of determining the direction on the basis of the comparator outputs.

In case of two magneto-resistors $R_1$, $R_2$ the resistance values $r_1$, $r_2$ of the magneto-resistors $R_1$, $R_2$ are converted to current signals in two resistance-to-current converters, respectively. The two current signals can be compared with at least one reference signal, said reference signal being generated by a reference signal generating means 150. Alternatively, the ratio of the two current signals can be determined using one or two translinear multipliers. Subsequently, said ratio or ratios can be compared with a constant reference values or constant reference values, said reference values being generated by a reference value generating means. Alternatively, the two ratios $r_1/r_2$, $r_2/r_1$ can be compared with each other.

In case of three magneto-resistors $R_1$, $R_2$, $R_3$ the resistance values $r_1$, $r_2$, $r_3$ of the magneto-resistors $R_1$, $R_2$, $R_3$ are converted to current signals in three resistance-to-current converters, respectively. The signals can be compared with at least one reference signal, said reference signal being generated by a reference signal generating means 150. The ratios of the signals can be determined using alternatively three, six or more translinear multipliers. Subsequently, the signal ratios can be compared with at least one reference value generated by a reference value generating means. Alternatively, the generated ratios $r_1/r_2$, $r_2/r_3$, $r_3/r_1$ or $r_1/r_2$, $r_2/r_1$, $r_2/r_3$, $r_3/r_2$, $r_3/r_1$, $r_1/r_3$ can be compared with each other.

According to the principles described above, any number of magneto-resistors can be used in the relative position detecting apparatus.

Mutual comparison of the varying signals in the comparator block has certain advantages instead of comparison with constant reference signals. First, the associated reference signal generating means are eliminated. Second, common mode interference coupled to the signal lines is to some extent cancelled out.

In further embodiments the factor block 100 and the combiner block 120 are together used to generate a set of linear combinations of the signals, each linear combination $LC_i$ of a plurality of signals $MD_i$ being defined as $$LC_i = \sum_1^{nn} c_i MD_i \tag{2}$$

in which any of the coefficients ci can be zero. nn denotes the number of the input signals received by the factor block.

Figure 10A:
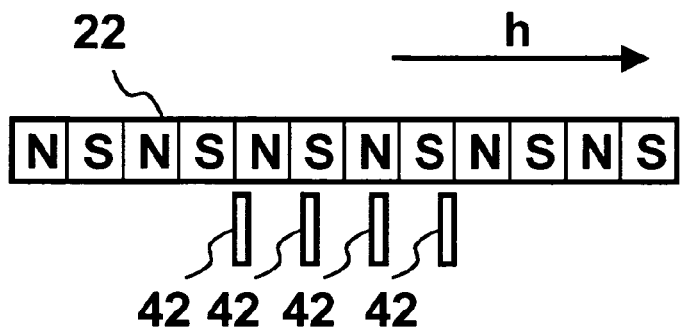
FIGS. 10a to 10c show alternative arrangements of the magnetic field generating elements and the magneto-resistors.
Figure 10B:
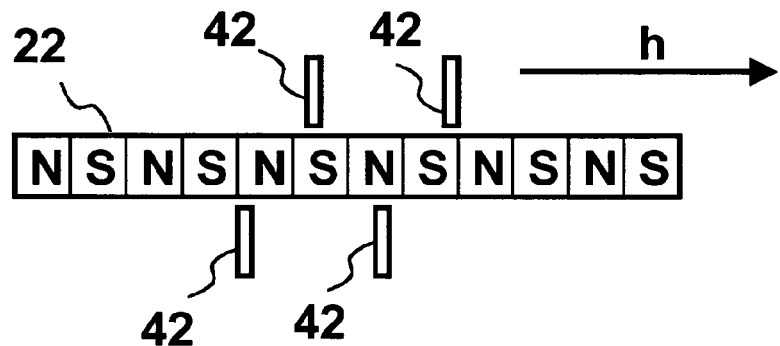
Figure 10C:
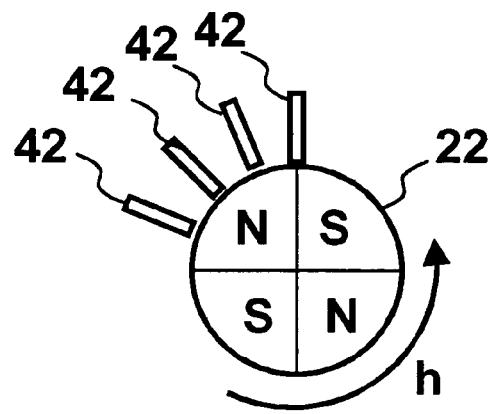

The relative arrangement of the magneto-resistors and the magnetic field generating elements is not limited to the arrangement shown in FIG. 2. Alternative arrangements are shown in FIGS. 10a to 10c. FIG. 10a illustrates the possibility to increase the distance between adjacent magneto-resistors by a scattered arrangement such that each magneto-resistor is exposed to a magnetic field generated by different magnetic field generating element 22, i.e. generated by a different N-S-pair. This arrangement is advantageous if the length L of the magnetic field period is very short compared with the available dimensions of the magneto-resistors, and consequently there is a lack of space. FIG. 10b illustrates the possibility to distribute the magneto-resistors to different sides of the magnetic field generating elements. The concept of position can be extended to include also the angular position in combination with the number of completed revolutions. FIG. 10c illustrates the detection of angular position of a rotating object. The rotating magnetic field generating element can comprise any number of magnetic field generating elements 22 (i.e. N—S pole pairs). This arrangement is advantageous for example if the position detecting apparatus is coupled to a rotating motor or a rotating servomechanism.

Furthermore, the relative movement of the magnetic field generating elements and the magneto-resistors can be linear, curved or rotational or a combination thereof. The magnetic field generating elements can be arranged in a linear, cylindrical, spherical manner. The magnetic field generating elements can also be arranged to a configuration of a screw thread with a predetermined pitch. The magnetic field generating elements can also be arranged to an essentially flexible formation, a periodically magnetized audio tape being an example. The magnetic field can be generated by any permanently magnetized material, e.g. Ni Co or Fe-base metal, alloy or compounds thereof. Alternatively, the magnetic field can be generated by an electromagnet or a plurality of electromagnets.

It is advantageous to select the distance d between the centerlines of adjacent magneto-resistors according to the following equation:

$$d = ML + \frac{L}{2N} \tag{3}$$

where N denotes the number of the magneto-resistors and M is an integer. The preferred values of M are zero and one.

Furthermore, in case of rotating magnetic field generating elements, the angular distribution of the magnetic field can exhibit periodicity, the angle of an angular period being denoted by β. In that case it is advantageous to select the angular separation α of the centerlines of adjacent magneto-resistors according to the following equation:

$$\alpha = M\beta + \frac{\beta}{2N} \tag{4}$$

where N denotes the number of the magneto-resistors and M is an integer.

It is advantageous to select the linear combinations and the pairs of the compared signals such that the changes of the position corresponding to subsequent generated pulses are substantially of equal length.

It is emphasized that the relationship between the resistance values and the current generated by the resistance-to-current converter need not to be a linear one. In that case it is advantageous to select the linear combinations performed in the factor block and the combination block such that the physical shifts of the movable object corresponding to the generated adjacent pulses should be substantially equal.

For the initialization of the counter, the device may further comprise a mechanical, optical, magnetic sensor or switch to detect the correct initial position or origin of the movable object. In addition to actuators, servomotors or piezo-electric drive mechanisms, the position of the movable object may be adjusted manually.

The resistance-to-current converters, multiplier-divider block, factor block, combiner, comparators, error corrector block, direction detector and the counter can realized using known electrical circuits based on transistors, resistors, capacitors, operational amplifiers, known integrated circuit elements or programmable circuit elements. The signal processing may also take place partially or completely in a computer. The generation of the signal ratios in the multiplier-divider block is not a necessary step and can be omitted. The resistance-to-current converter 62 can be realized also by various other means than the one depicted in FIG. 5. The device may also comprise current-to-voltage converters (not shown) to convert current signals to voltage signals. The comparator block 140 may comprise voltage comparators to compare the relative magnitudes of voltage signals.

The processing and transfer of the signals within and/or between the multiplier-divider block, factor block, combiner, comparators, error corrector block, direction detector and the counter may take place completely or partially by digital, optical or radio-frequency means.

The magneto-resistors can be protected against external magnetic interference using magnetic shields made of material with high permeability such as iron or a material known as mu-metal.

The focus distance of an imaging system can be adjusted by changing the position of one lens or a group of lenses. Furthermore, in certain systems, the ratio of an image dimension to a respective target dimension may be adjusted by changing the position of one or more lenses or groups of lenses. Customarily, the adjustment of said ratio is called "zooming", and the respective lens or lenses are called zoom lenses.

The operation of imaging systems typically involves at least the adjustment of focusing and zoom lenses. Furthermore, imaging systems may comprise aperture adjustment mechanisms, color adjustment filters, polarizing filters, optical bandpass filters, range finding systems, image stabilization systems, display elements, reticles (e.g. cross-hair patterns or target-finding patterns) and data recording devices, which may require mechanical adjustments and, consequently, determination of the relative positions of related components.

An optical imaging system comprises typically an array of photo-detectors to convert an image to data, the array being based on Charged Coupled Device arrays (CCD arrays), Complementary Metal Oxide Semiconductor arrays (CMOS arrays), pyro-electric detectors, photodiodes or photomultiplier tubes. The image recording may also be based on photochemical process (e.g. film camera). The image formed by the imaging system may also be observed visually (e.g. binoculars) without any image recording.

The imaging may be based on infrared, visible and ultraviolet ranges of electromagnetic radiation, referring to optical wavelengths in the range 150-20 000 nm.

The optical imaging system may comprise or be a part of machine vision systems or personal identification systems (e.g. fingerprint identification, identification of facial features).

The optical imaging system may be a part of an image projection system, by which an image generated by an image-generating element (e.g. an array of light emitting diodes or micro-opto-electro-mechanical devices) is projected on any transparent or opaque surface acting as a display screen.

Figure 11:
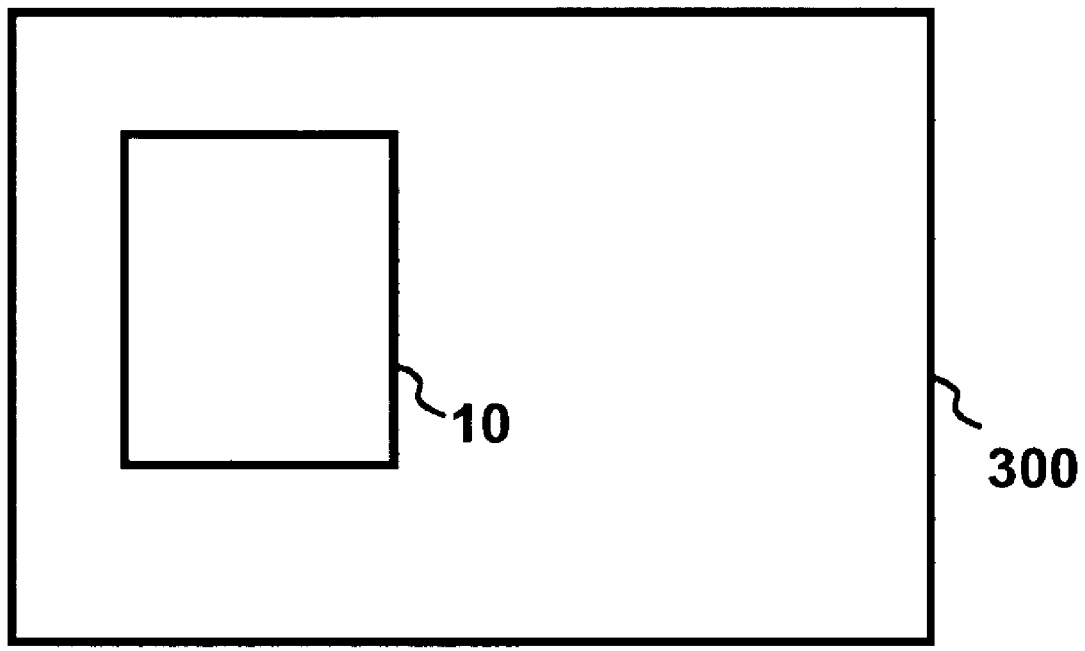
FIG. 11 shows a mobile device comprising an optical imaging system and in connection with said optical imaging system a position detecting apparatus according to the present invention.

Referring to FIG. 11, the device according to the present invention is especially suitable for use in optical imaging systems 10 implemented in mobile telecommunication and data processing devices 300. Examples of such devices are mobile phones comprising digital cameras, portable computers and handheld portable computers called as Personal Digital Assistants (PDA) equipped with imaging capabilities. The improved tolerance of electromagnetic interference is particularly advantageous when the relative position detecting apparatus according to the present invention is installed near a radio-frequency transmitter or digital signal processing means required for image or data processing purposes.

To any person skilled in the art, it will be clear that modifications and variations of the device and method according to the present invention are perceivable. The particular embodiments described above with reference to the accompanying drawings and tables are illustrative only and not meant to limit the scope of the invention, which is defined by the appended claims.

Tables

TABLE 1

Signals generated by the multiplier-divider block 80 in the first embodiment.

$MD_1 = I_3/I_1 = r_1/r_3$
$MD_2 = I_4/I_2 = r_2/r_4$
$MD_3 = I_1/I_3 = r_3/r_1$
$MD_4 = I_2/I_4 = r_4/r_2$

TABLE 2

Linear combinations generated by the factor block 100 and combiner block 120 in the first embodiment.

$LC_1 = 1 \times MD_1$
$LC_2 = 0.75 \times MD_1 + 0.25 \times MD_2$
$LC_3 = 0.5 \times MD_1 + 0.5 \times MD_2$
$LC_4 = 0.25 \times MD_1 + 0.75 \times MD_2$
$LC_5 = 1 \times MD_2$
$LC_6 = 0.75 \times MD_2 + 0.25 \times MD_3$
$LC_7 = 0.5 \times MD_2 + 0.5 \times MD_3$
$LC_8 = 0.25 \times MD_2 + 0.75 \times MD_3$
$LC_9 = 1 \times MD_3$
$LC_{10} = 0.75 \times MD_3 + 0.25 \times MD_4$
$LC_{11} = 0.5 \times MD_3 + 0.5 \times MD_4$
$LC_{12} = 0.25 \times MD_3 + 0.75 \times MD_4$
$LC_{13} = 1 \times MD_4$
$LC_{14} = 0.75 \times MD_4 + 0.25 \times MD_1$
$LC_{15} = 0.5 \times MD_4 + 0.5 \times MD_1$
$LC_{16} = 0.25 \times MD_4 + 0.75 \times MD_1$

TABLE 3

Inputs and outputs of the comparator block 140 in the first embodiment.

| Input | Output |
|---|---|
| $C_{in,1} \geq C_{in,9}$ | $C_{out,1} = 1$ |
| $C_{in,1} < C_{in,9}$ | $C_{out,1} = 0$ |
| $C_{in,2} \geq C_{in,10}$ | $C_{out,2} = 1$ |
| $C_{in,2} < C_{in,10}$ | $C_{out,2} = 0$ |
| $C_{in,3} \geq C_{in,11}$ | $C_{out,3} = 1$ |
| $C_{in,3} < C_{in,11}$ | $C_{out,3} = 0$ |
| $C_{in,4} \geq C_{in,12}$ | $C_{out,4} = 1$ |
| $C_{in,4} < C_{in,12}$ | $C_{out,4} = 0$ |
| $C_{in,5} \geq C_{in,13}$ | $C_{out,5} = 1$ |
| $C_{in,5} < C_{in,13}$ | $C_{out,5} = 0$ |
| $C_{in,6} \geq C_{in,14}$ | $C_{out,6} = 1$ |
| $C_{in,6} < C_{in,14}$ | $C_{out,6} = 0$ |
| $C_{in,7} \geq C_{in,15}$ | $C_{out,7} = 1$ |
| $C_{in,7} < C_{in,15}$ | $C_{out,7} = 0$ |
| $C_{in,8} \geq C_{in,16}$ | $C_{out,8} = 1$ |
| $C_{in,8} < C_{in,16}$ | $C_{out,8} = 0$ |
| $C_{in,9} \geq C_{in,1}$ | $C_{out,9} = 1$ |
| $C_{in,9} < C_{in,1}$ | $C_{out,9} = 0$ |
| $C_{in,10} \geq C_{in,2}$ | $C_{out,10} = 1$ |
| $C_{in,10} < C_{in,2}$ | $C_{out,10} = 0$ |
| $C_{in,11} \geq C_{in,3}$ | $C_{out,11} = 1$ |
| $C_{in,11} < C_{in,3}$ | $C_{out,11} = 0$ |
| $C_{in,12} \geq C_{in,4}$ | $C_{out,12} = 1$ |
| $C_{in,12} < C_{in,4}$ | $C_{out,12} = 0$ |
| $C_{in,13} \geq C_{in,5}$ | $C_{out,13} = 1$ |
| $C_{in,13} < C_{in,5}$ | $C_{out,13} = 0$ |
| $C_{in,14} \geq C_{in,6}$ | $C_{out,14} = 1$ |
| $C_{in,14} < C_{in,6}$ | $C_{out,14} = 0$ |
| $C_{in,15} \geq C_{in,7}$ | $C_{out,15} = 1$ |
| $C_{in,15} < C_{in,7}$ | $C_{out,15} = 0$ |
| $C_{in,16} \geq C_{in,8}$ | $C_{out,16} = 1$ |
| $C_{in,16} < C_{in,8}$ | $C_{out,16} = 0$ |

TABLE 4

Inputs and outputs of the error corrector block 160 in the first embodiment.

| $E_{in,q-1}$ | $E_{in,q}$ | $E_{in,q+1}$ | $E_{out,q}$ | $ErrCode_q$ |
|---|---|---|---|---|
| 1 | 1 | 1 | 1 | 0 |
| 1 | 1 | 0 | 1 | 0 |
| 1 | 0 | 1 | 1 | 1 |
| 1 | 0 | 0 | 0 | 0 |
| 0 | 1 | 1 | 1 | 0 |
| 0 | 1 | 0 | 0 | 1 |
| 0 | 0 | 1 | 0 | 0 |
| 0 | 0 | 0 | 0 | 0 |

The invention claimed is:

1. A position detecting apparatus in connection with an optical imaging system comprising at least one magneto-resistor and at least one magnetic field generating element, a respective resistance value of said at least one magneto-resistor being dependent on a magnetic field generated by the at least one magnetic field generating element, wherein said position detecting apparatus further comprises at least one resistance-to-current converting means to generate a current signal dependent on the resistance value of said at least one magneto-resistor.

2. The position detecting apparatus according to claim 1, wherein said position detecting apparatus comprises means to generate at least one ratio of current signals generated by the resistance-to-current converting means, said at least one ratio constituting a further signal comprising a ratio signal.

3. The position detecting apparatus according to claim 2, wherein said relative position detecting apparatus comprises means to generate at least one linear combination of the signals, said at least one linear combination of the signals constituting a further signal comprising a linear combination signal.

4. The relative position detecting apparatus according to claim 3, wherein said relative position detecting apparatus comprises comparator means to compare at least one current signal, ratio signal or linear combination signal with at least one other current signal, ratio signal or linear combination signal.

5. The relative position detecting apparatus according to claim 3, wherein said relative position detecting apparatus comprises comparator means and reference value generating means, said comparator means being arranged to compare at least one current signal, ratio signal or linear combination signal with at least one reference signal generated by the reference value generating means.

6. The relative position detecting apparatus according to claim 4, wherein the relative position detecting apparatus comprises a pulse generator, said pulse generator being arranged to generate a pulse when the state of any outputs of the comparator means changes.

7. The relative position detecting apparatus according to claim 6, wherein the relative position detecting apparatus comprises a counter capable of counting a number of pulses generated by the pulse generator, an output number of the counter being increased or decreased depending on a direction of movement.

8. The relative position detecting apparatus according to claim 7, wherein the relative position detecting apparatus comprises a direction detector capable of discriminating the direction of movement of the at least one magnetic field generating element with respect to the magneto-resistors.

9. The relative position detecting apparatus according to claim 6, wherein linear combinations of the signals and signal pairs compared by the comparator means are selected such that changes of relative position corresponding to subsequent pulses generated by the pulse generator are substantially of equal length.

10. The relative position detecting apparatus according to claim 7, comprising an error corrector block arranged to discriminate whether output states of the comparator means correspond to a physically possible state or to a physically impossible state.

11. The relative position detecting apparatus according to claim 10, wherein the error corrector block is arranged to prevent the increase and the decrease of the output number of the counter in such a case that the output states of the comparator means do not change consecutively.

12. The relative position detecting apparatus according to claim 1, wherein the arrangement of the magnetic field generating elements is substantially linear and said magnetic field generating elements comprise at least two in number.

13. The relative position detecting apparatus according to claim 1, wherein the magneto-resistors are four in number.

14. A mobile device comprising an optical imaging system and in connection with said optical imaging system a position detecting apparatus arranged to detect a position of a least one optical component of said imaging system, said position detecting apparatus comprising at least one magneto-resistor and at least one magnetic field generating element, a respective resistance value of said at least one magneto-resistor being dependent on a magnetic field generated by the at least one magnetic field generating element, wherein said position detecting apparatus further comprises at least one resistance-to-current converting means to generate a current signal dependent on the resistance value of said at least one magneto-resistor.

15. A mobile device according to claim 14, wherein said device is a digital camera.

16. A mobile device according to claim 14, wherein said device comprises at least one lens, said position detecting apparatus being arranged to determine a relative position of said at least one lens.

17. A mobile device according to claim 16, wherein movement of said at least one lens is adapted to affect a focus adjustment of said imaging system.

18. A mobile device according to claim 14, wherein said device comprises telecommunication capabilities.

19. A mobile device according to claim 14, wherein said device comprises data processing capabilities.

20. A mobile communication device comprising an optical imaging system and in connection with said optical imaging system a position detecting apparatus arranged to detect a position of a least one optical component of said imaging system, said position detecting apparatus comprising at least one magneto-resistor and at least one magnetic field generating element, the respective resistance value of said at least one magneto-resistor being dependent on a magnetic field generated by the at least one magnetic field generating element, wherein said position detecting apparatus further comprises at least one resistance-to-current converting means to generate a current signal dependent on the resistance value of said at least one magneto-resistor.

* * * * *

UNITED STATES PATENT AND TRADEMARK OFFICE
CERTIFICATE OF CORRECTION

| | |
|---|---|
| PATENT NO. | : 7,352,172 B2 |
| APPLICATION NO. | : 11/091363 |
| DATED | : April 1, 2008 |
| INVENTOR(S) | : Mikko Ollila |

It is certified that error appears in the above-identified patent and that said Letters Patent is hereby corrected as shown below:

In column 13 at line 23 (claim 1, line 8), please delete "means" and insert --device-- therefor.
In column 13 at line 27 (claim 2, line 2), please delete "comprises means" and insert --is configured-- therefor.
In column 13 at line 32 (claim 3, line 2), please delete "relative".
In column 13 at lines 32-33 (claim 3, lines 2-3), please delete "comprises means" and insert --is configured-- therefor.
In column 13 at line 37 (claim 4, line 1), please delete "relative".
In column 13 at line 39 (claim 4, line 3), after "comprises" please insert --a-- and please delete "means".
In column 13 at line 43 (claim 5, line 1), please delete "relative".
In column 13 at line 44 (claim 5, line 2), please delete "relative".
In column 13 at lines 45-46 (claim 5, lines 3-4), please delete "comprises comparator means and reference value generating means, said comparator means being arranged" and insert --is configured-- therefor.
In column 13 at lines 48-49 (claim 5, lines 6-7), please delete "generated by the reference value generating means".
In column 13 at line 50 (claim 6, line 1), please delete "relative".
In column 13 at line 51 (claim 6, line 2), please delete "relative".
In column 13 at line 54 (claim 6, line 5), please delete "means".
In column 13 at line 55 (claim 7, line 1), please delete "relative".
In column 13 at line 61 (claim 8, line 1), please delete "relative".
In column 13 at line 62 (claim 8, line 2), please delete "relative".
In column 14 at line 1 (claim 9, line 1), please delete "relative".
In column 14 at line 3 (claim 9, line 3), please delete "means".
In column 14 at line 7 (claim 10, line 1), please delete "relative".
In column 14 at line 8 (claim 10, line 2), please delete "block".
In column 14 at line 9 (claim 10, line 3), please delete "means".
In column 14 at line 12 (claim 11, line 1), please delete "relative".
In column 14 at line 13 (claim 11, line 2), please delete "block".
In column 14 at line 16 (claim 11, line 5), please delete "means".
In column 14 at line 17 (claim 12, line 1), please delete "relative".
In column 14 at line 21 (claim 13, line 1), please delete "relative".

UNITED STATES PATENT AND TRADEMARK OFFICE
CERTIFICATE OF CORRECTION

PATENT NO. : 7,352,172 B2
APPLICATION NO. : 11/091363
DATED : April 1, 2008
INVENTOR(S) : Mikko Ollila It is certified that error appears in the above-identified patent and that said Letters Patent is hereby corrected as shown below:

In column 14 at line 34 (claim 14, line 11), please delete "converting means" and insert --converter-- therefor.

Signed and Sealed this

Second Day of June, 2009

JOHN DOLL
*Acting Director of the United States Patent and Trademark Office*